Feb. 5, 1952 — F. A. LOEBEL — 2,584,357
REGENERATIVE EVAPORATOR
Filed April 23, 1949 — 4 Sheets-Sheet 1

Inventor
Frederick A. Loebel
By Schroeder, Merriam, Hofgren & Brady
Attorneys

Feb. 5, 1952  F. A. LOEBEL  2,584,357
REGENERATIVE EVAPORATOR
Filed April 23, 1949  4 Sheets-Sheet 2

Inventor:
Frederick A. Loebel.
By Schroeder, Merriam, Hofgren & Brady
Attorneys

Feb. 5, 1952 F. A. LOEBEL 2,584,357
REGENERATIVE EVAPORATOR
Filed April 23, 1949 4 Sheets-Sheet 3
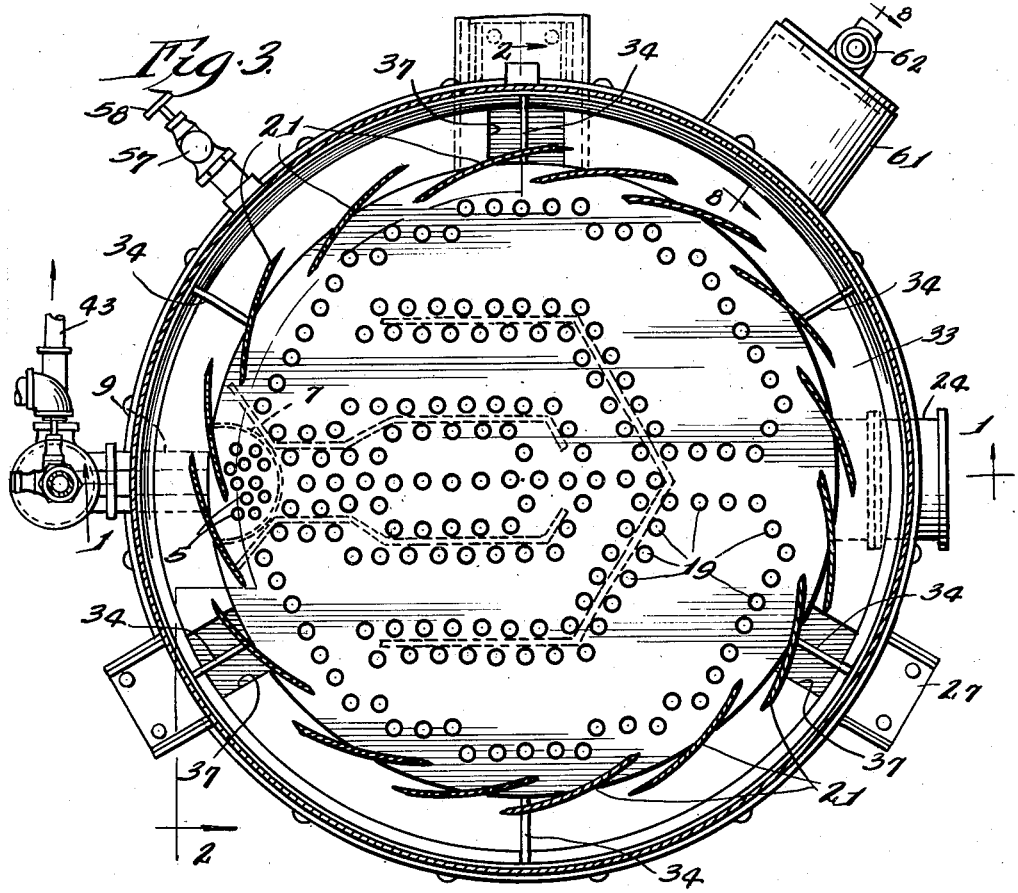
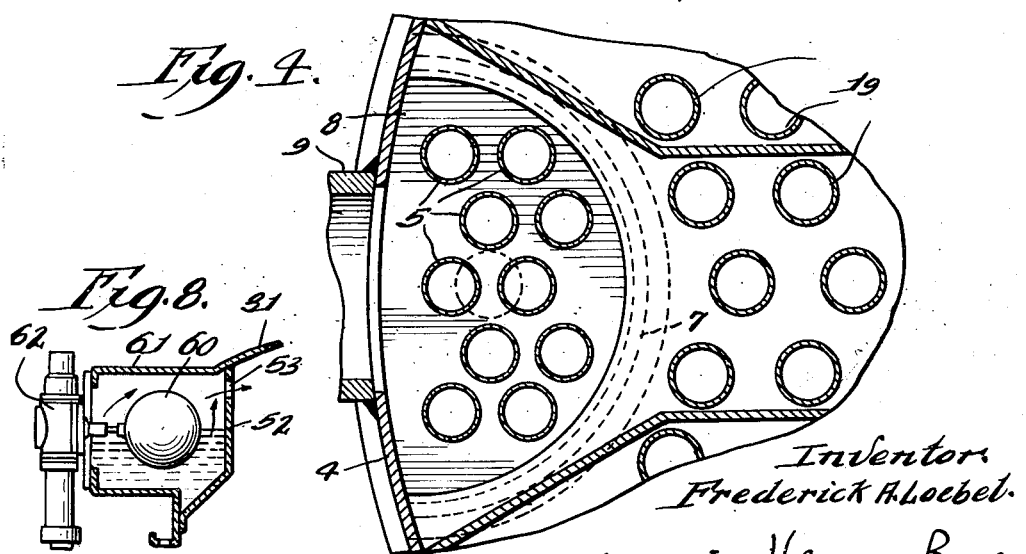
Inventor:
Frederick A. Loebel.
By Schroeder, Merriam, Hofgren & Brady
Attorneys

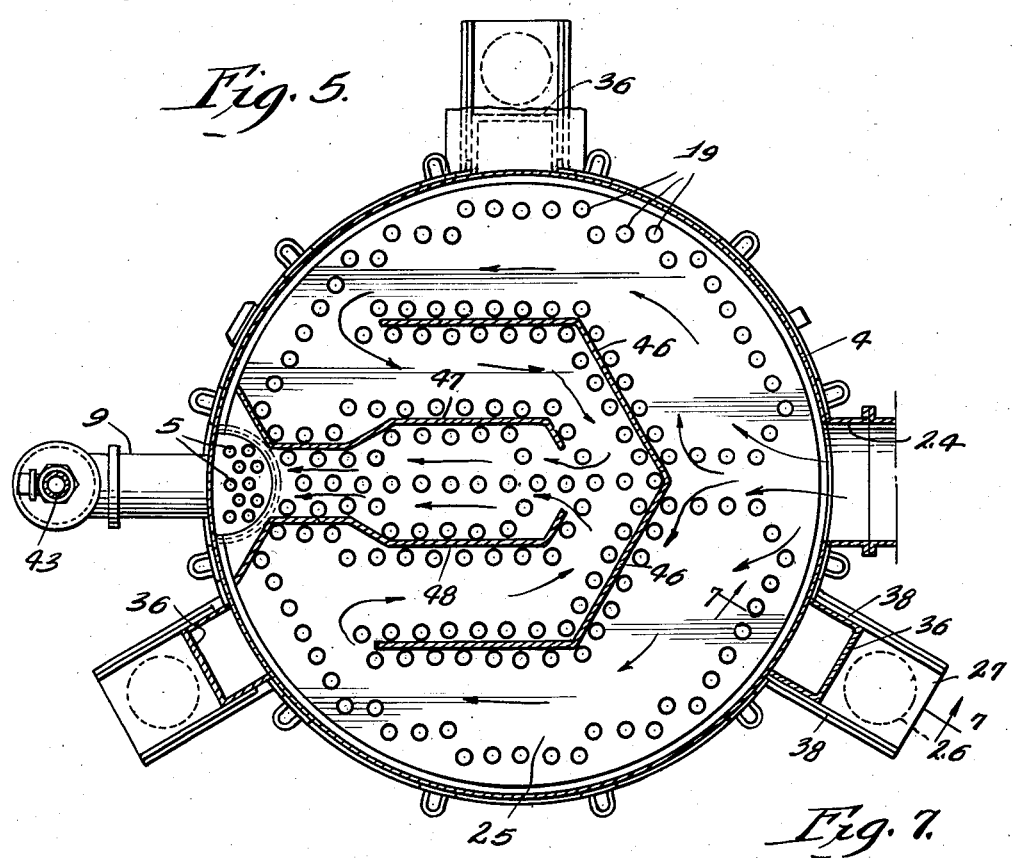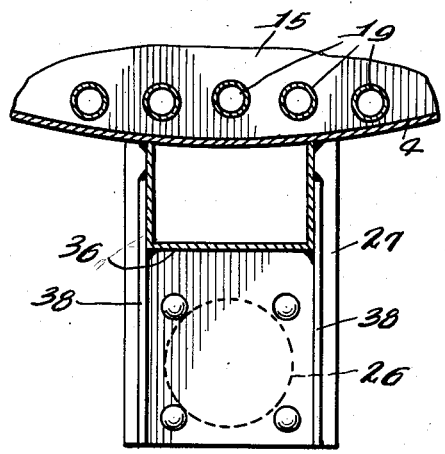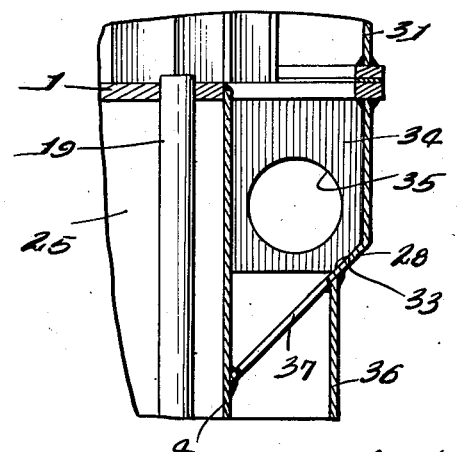

Patented Feb. 5, 1952

2,584,357

UNITED STATES PATENT OFFICE 2,584,357

REGENERATIVE EVAPORATOR

Frederick Arthur Loebel, Milwaukee, Wis., assignor to Cleaver-Brooks Company, a corporation of Wisconsin Application April 23, 1949, Serial No. 89,299

10 Claims. (Cl. 159—24)

The present invention relates to a pressure still and more particularly to an evaporator for such still. This application is a continuation in part of my copending application Serial No. 730,354, filed February 24, 1947, for "Pressure Still and Method of Distillation."

The invention is adapted for use in connection with the distillation of sea water, or other salt water solution, but is useful in connection with the distillation of other solutions or products or the separation by evaporation of the components of any fluid mixture wherein the components have different boiling temperatures. Any such mixture shall be referred to herein as "solution" and such operation shall be referred to as "distillation." The product produced shall be referred to as distillate or condensate.

The present evaporator includes an arrangement of parts for evaporating one of the components contained in the solution, and is adapted for use with a compressor or means for increasing the heat of the resulting vapors by compression and for returning the compressed vapors to the evaporator to supply heat to the incoming solution and at the same time condense the vapors into the distillate which it is desired to obtain from the solution, and then using the heat from the distillate and the vapors being condensed for preheating the incoming solution.

An object of the invention is to provide a novel and improved evaporator of the type referred to.

Another object is to provide an evaporator for efficiently exchanging heat between the solution and the vapors arising therefrom after they have been compressed, and for providing means for separating the liquid entrained in the vapors rising from the solution so that such vapors are substantially free of moisture when they leave the evaporator.

Another object is to combine in an evaporator structure some of the parts which in the system of said copending application were outside of the evaporator.

Another object is to combine in an evaporator novel means for preheating the incoming solution prior to its being mixed with the main body of the solution in the evaporator, and at the same time to deaerate said incoming solution and greatly reduce the forming of scale as well as corrosion in the evaporator tubes within the evaporator.

Another object is to provide an evaporator having a novel arrangement of spiral vanes beyond the outlet end of the evaporator tubes to give a centrifugal effect to the steam and entrained moisture emerging from said tubes and to deposit out entrained liquid therefrom and return it into the body of the solution.

Another object is to combine, in an evaporator structure, a hot well and a novel arrangement of water inlet pipe and cold water risers for preheating the incoming solution.

Another object is to incorporate in the vapor dome of the evaporator an engine boiler for connection with an internal combustion engine in a still system of the general type disclosed in said copending application.

Another object is to provide an evaporator with a novel arrangement of down-spouts or downtake conduits.

A further object is to provide an improved combination, construction and arrangement of parts in a pressure still evaporator, including a novel arrangement of baffles.

Further objects will become apparent from the following detailed description taken in connection with the accompanying drawings illustrating a preferred form of the invention, wherein:

Fig. 3 is a transverse section on the line 3—3 of Fig. 1;

Fig. 4 is an enlarged section on the line 4—4 of Fig. 1;

Fig. 5 is a transverse section on the line 5—5 of Fig. 1;

Fig. 6 is a fragmentary transverse section on the line 6—6 of Fig. 2;

Fig. 7 is an enlarged fragmentary section on the line 7—7 of Fig. 5; and

Fig. 8 is a fragmentary vertical section on the line 8—8 of Fig. 3.

Figure 1:
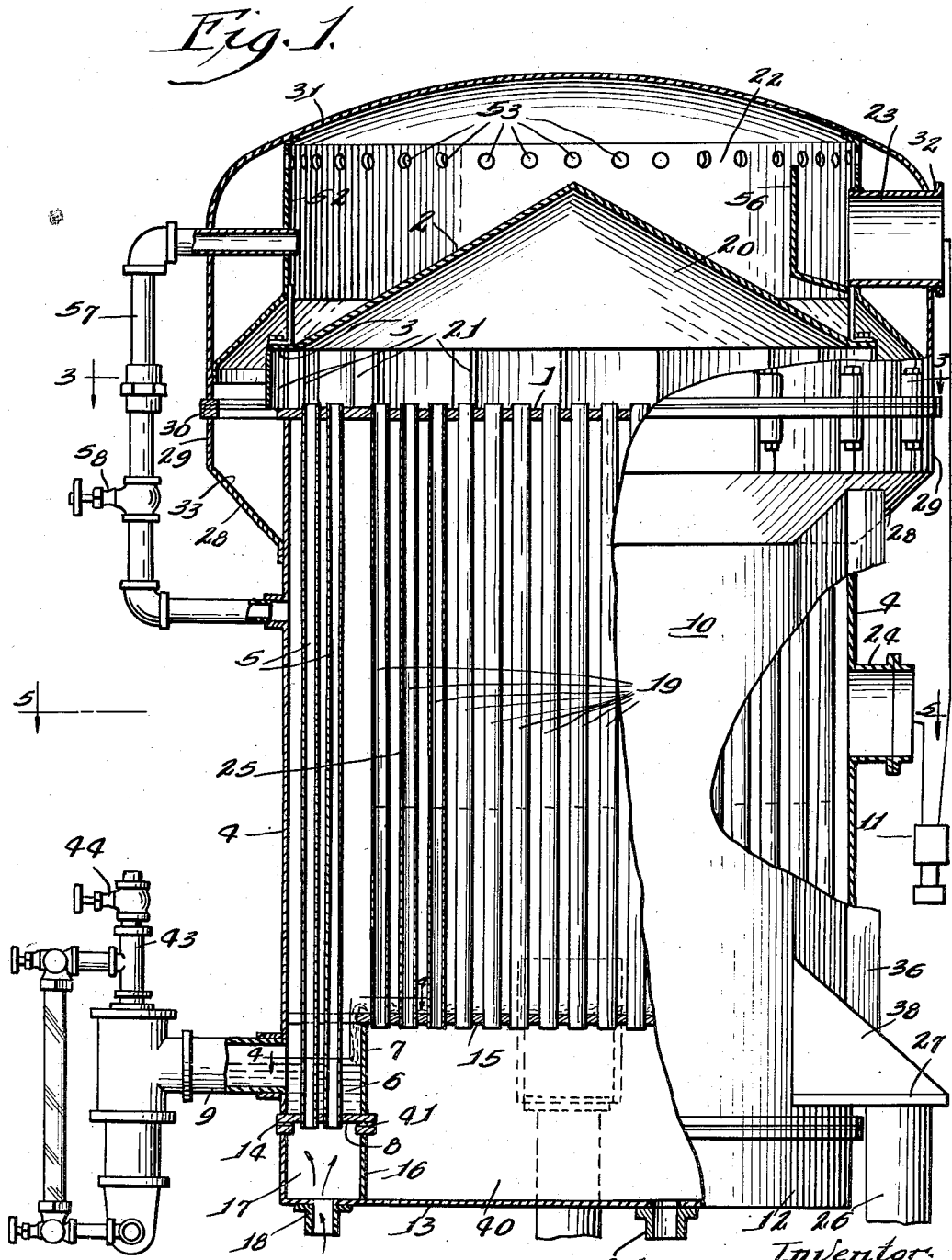
Fig. 1 is a longitudinal vertical section taken on the line 1 of Fig. 3, of a pressure still evaporator embodying my invention, with parts shown in elevation for sake of clearness, and showing a compressor illustrated diagramatically.

While the invention is susceptible of embodiment in various forms, there is shown in the drawings, and herein described in detail, a preferred form, with the understanding that it is to be considered as an exemplification of the principles of the invention. The scope of the invention will be pointed out in the appended claims.

Referring to the embodiment of the invention shown in the drawings, an evaporator 10 comprises an outer cylindrical side wall 4 having at its bottom a depressed base member 12 which is formed with a bottom wall 13 and is sealed at its upper edge by a gasket 14 to the bottom edge of the side wall 4. Secured to the interior of the side wall 4, by welding or otherwise as desired, at a distance above the bottom wall 13, is a bottom plate or tube sheet 15 having a large number of openings within which are sealed the bottom ends of vertical tubes 19. Secured, by welding or otherwise as desired, to the top end of side wall 4 is a top plate or tube sheet 1, likewise having a large number of openings within which are sealed the top ends of the tubes 19. Spaced above plate 1 is an upwardly extending conical deflector 2 secured by a marginal flange 3 to the top edges of a series of circumferentially spaced spiral vanes 21. These vanes at their bottom edges are secured for a portion of their length to the peripheral portion of the upper surface of the tube sheet 1 so as to form between the vanes a substantial number of spirally arranged passageways leading from the vapor dome space 20 beneath the cone-shaped deflector 2 to the space outside of the vanes and to the vapor dome space 22 above the cone-shaped plate. Space 22 communicates through vapor outlet 23 with piping leading to the inlet side of a compressor indicated diagrammatically at 11 (Fig. 1). Formed in an intermediate portion of the side wall 4 is an inlet connection 24 to which is connected piping leading from the outlet side of the compressor.

Formed within the side wall 4, surrounding the tubes 19, and between the top and bottom tube sheets 1 and 15, is a condensing chamber 25 for receiving compressed vapors from the compressor and transmitting heat therefrom to the solution within the tubes 19 thereby causing it to form into steam which passes into space 20, and at the same time condensing the vapors in chamber 25 to form distillate. As shown in Figs. 1 to 5, the evaporator is substantially full of tubes 19 slightly spaced apart, to provide passages therebetween and therearound, for the hot compressed vapors and vertical baffles 46, 47 and 48 are arranged between certain of the tubes to provide passageways for the vapors, which passageways gradually decrease in width from the vapor inlet 24 to the distillate outlet 5 and thus results in substantially uniform vapor velocities throughout the condensing chamber. This eliminates low vapor velocities in portions of the evaporator which might cause the vapor to become stagnant and air-bound. The baffles extend vertically from the bottom tube sheet 15 to the top tube sheet 1 within the chamber 25, so that the vapors follow the paths indicated by the arrows in Fig. 5.

The baffle 46 is of U-shape and is located in the central portion of the chamber with the base of the U toward the vapor inlet 24. The baffles 47 and 48 extend from the distillate outlet 5 side of the evaporator (where they are secured to the side wall of the evaporator) into the hollow of the U-shaped baffle 46. From the side wall 4 at the distillate outlet the baffles 47 and 48 converge inwardly and are then in spaced parallel relation, and then diverge outwardly, and are then in wider spaced parallel relation, and finally they converge inwardly, but are spaced apart at their free vertical edges. From this arrangement it will be seen that the hot compressed vapors enter the inlet 24 into a passageway of substantially large cross section between the exterior of the baffle 46 and the evaporator wall, the effective cross sectional area of which passageway decreases as the steam approaches the free edges of said U. As seen in Fig. 5, there is one of these passageways on each of the outer sides of the baffle 46. The vapors then pass around the free ends of the baffle 46, one stream on each side thereof, and into the spaces between this baffle and the inner baffles 47 and 48, and then around the free ends of the latter and into the space between baffles 47 and 48. From this space the passageway further decreases in width and the uncondensed portion of the vapors (which by this time will be small because of the condensation in the condensing chamber) will pass over a group of preheating tubes 5 through which the incoming feed solution passes. It is thus seen that the velocity of the vapor or steam passing through the evaporator is maintained approximately uniform, to give the greatest efficiency in transfer of heat to the liquid within the tubes 19.

As seen in Figs. 1, 2, 4 and 5 there is provided within the evaporator on the side opposite from the inlet 24, an inside hot well 6 which receives the hot distillate which has condensed in, and has fallen to the bottom of, chamber 25, and through which hot well said preheating tubes 5 pass. Hot well 6 comprises an arcuate inner wall 7 which along its vertical edges is welded or otherwise sealed to the adjacent bottom portions of the side wall 4 and at its upper edge to the bottom tube sheet 15 around the marginal edges of an arcuate recess formed therein. The bottom of said hot well is closed by a plate 8 which is welded or otherwise sealed to the adjacent bottom edge of side wall 4 and the bottom edge of the wall 7. This plate 8 is formed with a plurality of openings within which are sealed the bottom ends of the pre-heating tubes 5, the top ends of these tubes being sealed in openings in the top tube sheet 1. Fig. 4 shows an enlarged horizontal interrupted section through this hot well. Distillate outlet 9 connects with the interior of hot well 6.

Figure 2:
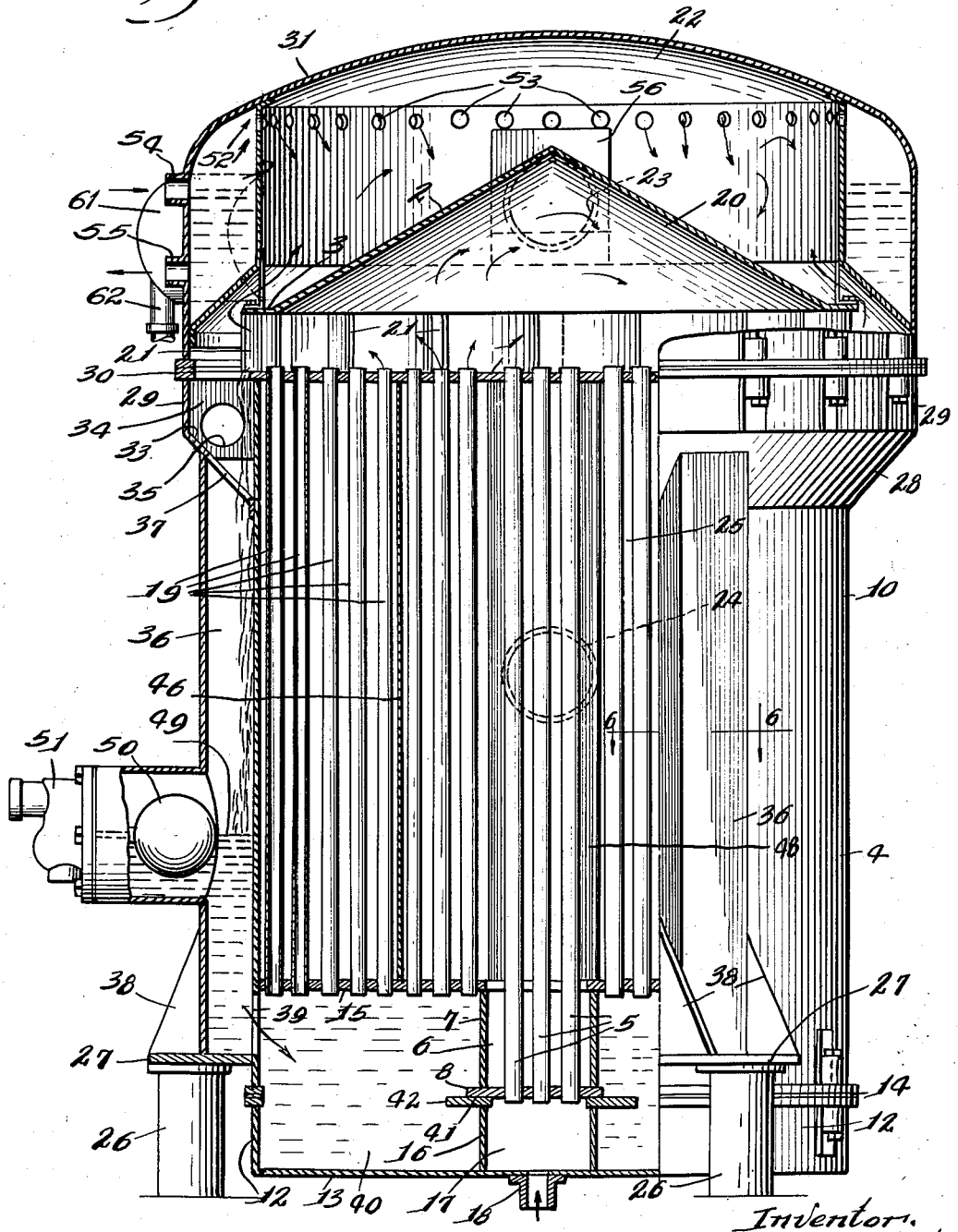
Fig. 2 is a vertical section on the line 2—2 of Fig. 3.

In order to support the hot well bottom 8, arcuate wall 7 and tubes 5 rigidly in place in the evaporator, there is provided an arcuate wall 16 in vertical registry with the inner hot well wall 7 and sealed at its bottom edge to the bottom wall 13 and at its upper edge to the hot well bottom plate 8. Wall 16 is also sealed along its vertical edges to the vertical flange of the base member 12 to form a chamber 17 for incoming solution. As seen in Figs. 1 and 2 the bottom wall 13 is provided with a coupling 18 serving as a feed inlet to chamber 17 for solution being fed into the evaporator.

The evaporator is preferably mounted on supports 26 by means of plates 27 welded to the side wall 4, and brace plates 38. As seen in Figs. 1 and 2, an outwardly and upwardly inclined annular wall 28 is welded to the side wall 4 a distance below the top edge of the latter, and at an intermediate portion of its height is bent into an upwardly extending vertical wall 29. Fixed to the upper edge of wall 29 is a flange 30 upon which is positioned a gasket clamped between flange 30 and a similar flange around the bottom edge of a dome member 31 which carries a coupling member 32 forming the vapor outlet 23. As seen in Figs. 1 and 2, the side wall 4 extends upwardly beyond where the inclined wall 28 is secured thereto, a distance such as to position the top ends of tubes 19 approximately at a level with the gasket on flange 30.

This arrangement provides a trough or gutter 33 for receiving the liquid portion of the solution and vapor passing out of the upper ends of tubes 19. Fixed to the side walls of gutter 33 at circumferentially spaced points around the gutter are a plurality of stiffening plates 34 which stop short of the bottom of the gutter and are each formed with an opening 35 therethrough to facilitate the flow of liquid through the gutter to the plurality (three shown for illustrative purposes) of down-spouts 36. Down-spouts 36 are U-shaped elongated hollow metal members welded or otherwise secured along their vertical free edges to the outer surface of the side wall 4, and sealed at their bottom edges to the plates 27 and at their top edges to the inclined wall 28. Wall 28 at points in registry with the hollow interiors of down-spouts 36 is formed with openings 37 through which liquid may flow from gutter 33 into said down-spouts. Referring to Fig. 2, it will be seen that the down-spouts extend below the bottom tube sheet 15 of the vaporization chamber 25, and the side wall 4 is formed with openings 39 one for each down-spout, to lead the liquid in the down-spouts into the solution chamber 40 in the bottom of the evaporator. A gasket 41 is clamped between the top flange 42 of the hot-well-supporting wall 16 and the bottom wall 8 of the hot well to further insure that no distillate will pass from the hot well 6 into the solution chamber 40. Extending upwardly from the distillate outlet 9 is a vent pipe 43, controlled by a valve 44, for leading any uncondensed vapor, air, gases, or the like to any suitable place of further treatment or disposal as desired. Bottom wall 13 is provided with a blow-down connection 45 (Figs. 1 and 5) to which may be connected any suitable pipe for blowing out the contents of the solution chamber 40 when desired, or for continuously withdrawing concentrated solution.

In operation, the evaporator is supplied with raw solution passing through the feed coupling 18 into the chamber 17 from whence it passes upwardly through the preheating tubes 5 surrounded by hot vapors in the vaporization chamber 25 and the hot distillate in the hot well, and thus is heated thereby. The solution then passes out of the top of tubes 5 and flows over the top surface of top tube sheet 1 and into the gutter 33 from whence it flows downwardly through the down-spouts 36 and openings 39 into the solution chamber 40, and rises up to the desired level in tubes 19. The inflow of solution is controlled by any suitable means, as for example by a float 50 which controls an inlet valve 51 so as to maintain a liquid level in the down-spouts and the tubes 19 at a height desired, as shown for illustrative purposes at 49 in Fig. 2.

To start the heating operation steam may be initially introduced into the chamber 25 or into the compressor 11, from any suitable source, as for example, as disclosed in said copending application. This steam is compressed by the compressor and its temperature substantially raised, and it is then forced by the compressor through the vapor inlet 24 into the chamber 25 and into contact with the tubes 19. The solution in the tubes is thus heated, causing the water in the solution to form into steam and at the same time condensing the vapors in chamber 25 into pure distilled water which flows downwardly to the lower portion of the chamber and into the hot well 6 and out through the distillate outlet 9. This hot distillate surrounding the bottom end portions of feed inlet pipes 5 preheats the incoming solution which is further preheated by the uncondensed portion of the hot vapors surrounding pipes 5 above the distillate level in the hot well. Instead of admitting the solution directly into the bottom chamber 40 of the evaporator where it might be short-circuited to the blow-down outlet 45, the incoming solution is led upwardly through the preheater pipes 5 to the top tube sheet 1 where it overflows into the gutter and down the down-spouts, thus picking up heat during its progress.

The compressed vapors entering the condensing chamber 25 through inlet 24 strikes the baffle 46 and is divided into two streams passing around the free edges of this baffle and then in the opposite direction through the space between baffles 47 and 48 and to and around the preheater pipes 5. It is thus seen that the vapor passage gradually decreases in width from the inlet to the distillate outlet, thus resulting in substantially uniform vapor velocities throughout the evaporator. The vapors in passing around and in contact with tubes 19 and 5, sooner or later condense and fall to the bottom of the chamber 25 as distillate which flows into the hot well 6.

The steam formed within tubes 19 passes upwardly therefrom into the chamber 20 thereabove, from whence it flows through the openings between the spirally curved vanes 21, in spiral paths, at a velocity of 25 to 45 feet per second, striking against the opposite lower wall of the dome member 31 and then spirally upwardly into chamber 22, out through outlet 23, and to the compressor. During the passage of steam from tubes 19 through chamber 20, between the vanes and into chamber 22, any liquid or droplets in the steam will be caught by the side walls of chamber 22 and by the top of the cone-shaped cover 2, as well as the upper surface of the top plate 1, and be directed into gutter 33 and down-spouts 36, back into the body of solution in the solution chamber 40. The steam passing from chamber 22 to the compressor is compressed by the latter and elevated to a higher temperature and is forced by the compressor through vapor inlet 24 to heat solution and itself be condensed into distillate.

As will be understood the initial steam introduced into the vaporization chamber or the compressor to start the operation will be discontinued as soon as sufficient steam is produced in tubes 19 to carry on the operation, as explained in said copending application. It is further pointed out that the above described evaporator reduces the formation of scale on the interior surfaces because the bicarbonates in the feed water are broken down into carbonates prior to contact in the evaporator tubes 19. In this respect the new arrangement of hot well and preheater pipes deaerates the water, since $CO_2$, oxygen, and other gases are released from pipes 5 into the steam space thereabove instead of being mixed with the solution, and are thus prevented from flowing upwardly through the evaporator tubes 19. Through hydrolysis, the carbonates react with the water to form hydroxide ions with an attendant increase in pH. Hydroxide ions then combine with magnesium ions to form insoluble magnesium hydroxide, which is largely carried out through the blowdown.

It is also to be noted that the use of integral built-in down-spouts not only provides ducts for the down flowing water, but also forms a rigid structural support for the evaporator. The centrifugal steam separator, including the spiral vanes 21, is highly efficient.

Another improvement is the provision in the vapor dome of an inwardly spaced inner annular wall 52 sealed at its upper and lower edges to the inner surface of the vapor dome 31 to form a space for receiving water from the cooling jacket of an internal combustion engine used in the distilling system as disclosed in said copending application. This space forms an engine boiler, and through the wall 52 near its upper edge is formed a series of holes 53 to permit passage of steam from within this boiler into the vapor space 22 in the vapor dome. Referring to Fig. 2, the water and steam from the engine jacket enters the space between wall 52 and the side walls of the dome 31, through an inlet connection 54, the liquid portion thereof returning through the outlet connection 55 to the engine cooling water pump of said copending application. The steam passing through openings 53 into the vapor space 22 passes over a baffle wall 56 and through the vapor outlet 23 to the intake side of the compressor, where it is compressed to a higher temperature and passes, with the other compressed vapors from the evaporator, into the condensing chamber 25.

The steam from the engine cooling system may be used for starting the operation of the evaporator instead of using starting steam from some other source. Any liquid condensing from the steam passing through openings 53 into the vapor space 22 will find its way into the gutter and down-spouts and mix with the solution within the solution chamber 40 and tubes 19.

The vapor dome chamber 22 is connected with the condensing chamber 25 by means of a pipe 57 equipped with a valve 58. Inasmuch as the evaporator is filled with air at the start, the compressor also compresses, heats and circulates this air which also gives up its heat to the solution in the evaporator, and this air being uncondensable is recirculated from the chamber 25 through pipe 57 to the vapor dome space 22 again and again through the compressor. As the solution in the evaporator heats up, the water in it forms steam which gradually displaces the air which escapes through the outlet 9 and pipe 43. When sufficient time has elapsed for the escape of such air, valve 58 will be closed.

As will be understood, the preheater pipes 5 will have cold solution passed thereinto which will complete the condensation of the vapors in chamber 25 as they are forced to pass through the decreasing passages of baffles 46 to 48 and into the confined space surrounding these cooler pipes. This structure accordingly constitutes a vent condenser in the evaporator.

In Fig. 8 is shown an engine boiler make-up water control having a float valve 60 located in closed extension walls 61 forming a space connected with the interior of the dome boiler space, said float operating a safety cutoff switch 62.

I claim:

1. A self-contained evaporator for a still, comprising, a cylindrical side wall having a top transverse tube sheet, a bottom transverse tube sheet, a bottom wall spaced from the bottom tube sheet, a trough member mounted upon the outside of the evaporator side wall near the top thereof to form a gutter therearound, a hood member mounted on the trough member, and tubes fixed at their ends to said tube sheets to extend therebetween, all forming an upper chamber, an intermediate vapor condensing chamber between the tube sheets and surrounding the tubes, and a bottom solution chamber having communication with the upper chamber through said tubes, a conical baffle plate spaced between the top tube sheet and the top of the hood member with the apex of said baffle plate extending upwardly, said hood member having a vapor outlet opening above said plate, a plurality of circumferentially spaced curved vanes having their outer ends stopping short of the hood member, said vanes being arranged in a circular series around the outer edge portion of the top tube sheet and fixed thereto outside of the open upper ends of the tubes, said baffle plate having its marginal edge portion fixed to the upper edges of the vanes, and a plurality of down-spouts of U-shaped cross-section having their vertical free edges sealed to the outer surface of said side wall, said down-spouts having open communication at their ends with said gutter and the solution chamber.

2. An evaporator as claimed in claim 1, having an open top hot well having a curved side wall extending from an opening in the bottom tube sheet downwardly into the solution chamber but sealed therefrom, a bottom wall in the hot well, and a solution preheating tube extending through the hot well bottom wall and through the vaporization chamber and top tube sheet, whereby incoming feed solution may pass through the preheating tube, over the top tube sheet, into the gutter and down the down-spout into the solution chamber.

3. An evaporator comprising, a closed side wall having a pair of vertically spaced transverse tube sheets, a bottom below the lower tube sheet, and a hood member all forming an upper vapor chamber, an intermediate condensing chamber and a bottom solution chamber, tubes extending through the intermediate chamber and forming passageways between the upper and bottom chambers, a down-spout connecting the upper chamber and bottom chamber outside of the intermediate chamber, an inner wall in the upper chamber fixed at its upper and lower edges with the inner surface of the hood member to form a boiler space, inlet and outlet connections to said boiler space to lead liquid and steam thereinto and liquid therefrom, and a steam passage opening in the upper portion of said inner wall for conducting steam from said boiler space into the interior of said upper chamber.

4. An evaporator as claimed in claim 3, including a pipe extending through said boiler space into the upper chamber at one end and into the intermediate chamber at the other end for conducting vapors, air and uncondensed gases from the intermediate chamber to the upper chamber, and a valve in said pipe for selectively opening and closing the passageway therein.

5. An evaporator for a still comprising, a closed cylindrical side wall, a top hood member, a bottom wall and top and bottom tube sheets spaced apart and intermediate said hood member and bottom wall, forming an upper vapor chamber in the hood member, an intermediate condensing chamber between the tube sheets and a bottom solution chamber, tubes extending between the tube sheets and establishing communication between the bottom solution chamber and the vapor chamber, a deflector within the hood member and dividing the vapor chamber under the hood into upper and lower vapor spaces, a plurality of peripherally spaced vanes between the deflector and the top tube sheet forming tangential passages conducting vapors from the lower vapor space into the upper vapor space, means forming a gutter surrounding the upper portion of said cylindrical side wall and in communication with the upper vapor space to collect liquid separated from the vapor, a conduit connecting said gutter to the solution chamber, an annular wall positioned within said hood member and forming a liquid chamber surrounding said upper vapor space, said annular wall having a plurality of openings along its upper edge to permit vapor to pass from said liquid chamber into the upper vapor space, liquid inlet and outlet openings in said hood member for said liquid chamber, and means for controlling the inlet of liquid to said liquid chamber and operable to maintain the level of liquid therein below said vapor openings.

6. An evaporator comprising, a cylindrical side wall having upper and lower transverse tube sheets forming a condensing chamber therebetween, a trough member fixed to the upper portion of the side wall a distance below its upper edge, a hood member sealed to the trough member and forming an upper chamber above the upper tube sheet, a bottom member sealed to the side wall and forming a solution chamber below the bottom tube sheet, a down-spout having communication with the trough member and solution chamber for conducting liquid from the upper chamber to the solution chamber, evaporator tubes extending between the tube sheets and through the condensing chamber to provide communication between the solution chamber and upper chamber, and a hot well in the condensing chamber below the level of the lower tube sheet and preheater solution conducting pipes extending through the hot well and the condensing chamber to conduct all incoming solution to the upper chamber from which it then passes down the down-spout to the solution chamber.

7. An evaporator as claimed in claim 6, including an inlet feed solution chamber within the bottom chamber but disconnected therefrom and connected with said preheater pipes.

8. An evaporator for a still, comprising, a cylindrical side wall having vertically spaced tube sheets, a bottom and a hood, forming an upper vapor chamber, an intermediate vapor condensing chamber and a bottom solution chamber, solution evaporating tubes extending through said condensing chamber and in communication with the upper and bottom chambers, an inlet in the condensing chamber for hot vapors to surround said tubes, an outlet in the condensing chamber for distillate collecting in the bottom thereof, a substantially U-shaped baffle in the central portion of the condensing chamber having its closed end facing said inlet and the baffle walls spaced from said side wall, a pair of laterally spaced baffle plates having varying width of space therebetween, the vertical free edges of said pair of baffle plates being spaced apart and inclined toward each other and located within the hollow of the U-shaped baffle, but spaced from the walls thereof, the opposite vertical edges of said pair of baffle plates diverging from each other and being secured to the evaporator side wall, a hot well in the bottom of the condensing chamber between the diverging portions of said pair of baffle plates and at said outlet, and a feed solution preheating tube extending through and from the hot well through the top tube sheet into the upper chamber, said preheater tube being positioned in the space between the diverging portions of said pair of baffle plates.

9. An evaporator comprising, a closed side wall having spaced tube sheets, a bottom and a hood member forming a bottom solution chamber, an upper vapor chamber, and an intermediate vapor condensing chamber, tubes secured in said tube sheets and communicating with the solution chamber and upper vapor chamber and extending through the intermediate chamber, an inlet for feeding preheated solution to the solution chamber and an outlet for conducting condensate from the intermediate chamber, a partition wall inside said hood member forming with the hood member a boiler space about the periphery of the upper vapor chamber, said partition wall dividing the boiler space from an upper vapor chamber passage for vapors from said tubes, liquid inlet and outlet connections extending through the hood member and communicating with said boiler space for admitting and discharging a liquid to and from the boiler space, said partition wall having an opening therein for passage of steam from the boiler space into the upper vapor chamber, and a liquid level controller operable to maintain liquid in the boiler space at a level substantially constant and below the level of said opening.

10. An evaporator as claimed in claim 9, including an inlet feed solution chamber within the bottom solution chamber but separate therefrom, preheater pipes extending through said tube sheets and communicating with said inlet feed solution chamber and the upper vapor chamber, a trough about the upper tube sheet, and a down-spout connecting said trough with the bottom solution chamber.

FREDERICK ARTHUR LOEBEL.

REFERENCES CITED

The following references are of record in the file of this patent:

UNITED STATES PATENTS

| Number | Name | Date |
|---|---|---|
| 521,946 | Cooper | June 26, 1894 |
| 894,407 | Suzuki | July 28, 1908 |
| 940,473 | Parker | Nov. 16, 1909 |
| 971,258 | Dunn | Sept. 27, 1910 |
| 989,982 | Kestner | Apr. 18, 1911 |
| 1,028,738 | Kestner | June 4, 1912 |
| 1,033,580 | Hall et al. | July 23, 1912 |
| 1,049,425 | Webre | Jan. 7, 1913 |
| 1,067,010 | Dunn | July 8, 1913 |
| 1,118,041 | Nobel et al. | Nov. 24, 1914 |
| 1,213,596 | DeBaufre | Jan. 23, 1917 |
| 1,363,323 | Kehoe | Dec. 28, 1920 |
| 1,436,739 | Webre | Nov. 28, 1922 |
| 2,015,680 | Kermer | Oct. 1, 1935 |
| 2,389,064 | Latham, Jr. | Nov. 13, 1945 |
| 2,512,938 | Henszey | June 27, 1950 |

OTHER REFERENCES

Tech. Manual TM 5-2068 U. S. Army, Corps of Engrs.